US009979029B2

(12) United States Patent
Yan

(10) Patent No.: US 9,979,029 B2
(45) Date of Patent: May 22, 2018

(54) SYSTEMS AND METHODS FOR GENERATING ELECTRIC POWER FROM SALTS AND MINERALS IN BODIES OF WATER

(71) Applicant: Moshe J. Yan, Highland Park, NJ (US)

(72) Inventor: Moshe J. Yan, Highland Park, NJ (US)

(*) Notice: Subject to any disclaimer, the term of this patent is extended or adjusted under 35 U.S.C. 154(b) by 1039 days.

(21) Appl. No.: 14/135,486

(22) Filed: Dec. 19, 2013

(65) Prior Publication Data

US 2015/0180049 A1    Jun. 25, 2015

(51) Int. Cl.

| H01M 6/04 | (2006.01) |
|---|---|
| H01M 10/36 | (2010.01) |
| H01B 7/00 | (2006.01) |
| H01M 6/24 | (2006.01) |
| H01M 4/06 | (2006.01) |
| H01M 4/38 | (2006.01) |
| B63H 19/00 | (2006.01) |

(52) U.S. Cl.
CPC .............. H01M 6/24 (2013.01); B63H 19/00 (2013.01); H01M 4/06 (2013.01); H01M 4/38 (2013.01); H01M 6/045 (2013.01); *H01M 2220/10* (2013.01); *H01M 2220/20* (2013.01)

(58) Field of Classification Search
CPC ............ H01M 4/06; H01M 4/38; H01M 6/04; H01M 6/045; H01M 6/24; H01M 2220/10; H01M 2220/20

USPC .......................................................... 429/105
See application file for complete search history.

(56) References Cited

U.S. PATENT DOCUMENTS

| 5,256,501 A * | 10/1993 | Hasvold | H01M 4/06 |
| | | | 429/119 |
| 2008/0044725 A1* | 2/2008 | Sadoway | H01M 2/0252 |
| | | | 429/149 |
| 2010/0068629 A1* | 3/2010 | Gordon | H01M 4/06 |
| | | | 429/325 |

* cited by examiner

*Primary Examiner* — Osei K Amponsah
(74) *Attorney, Agent, or Firm* — Henry I. Schanzer

(57) ABSTRACT

An electricity generating system includes a first electrode located at a first location in a body of salt water and a second electrode located at a second location in the body of salt water. The first and second electrodes may be of the same or different materials and are designed to present a large surface area to the body of water. A direct current flows between the two electrodes which is a function of the salinity of the water and the composition of the electrodes. The direct current is applied to the input port of a converting device which may be any suitable power inverter which can produce a output AC voltage corresponding to the direct current or a DC to DC converter to produce an output DC voltage corresponding to the direct current.

19 Claims, 15 Drawing Sheets

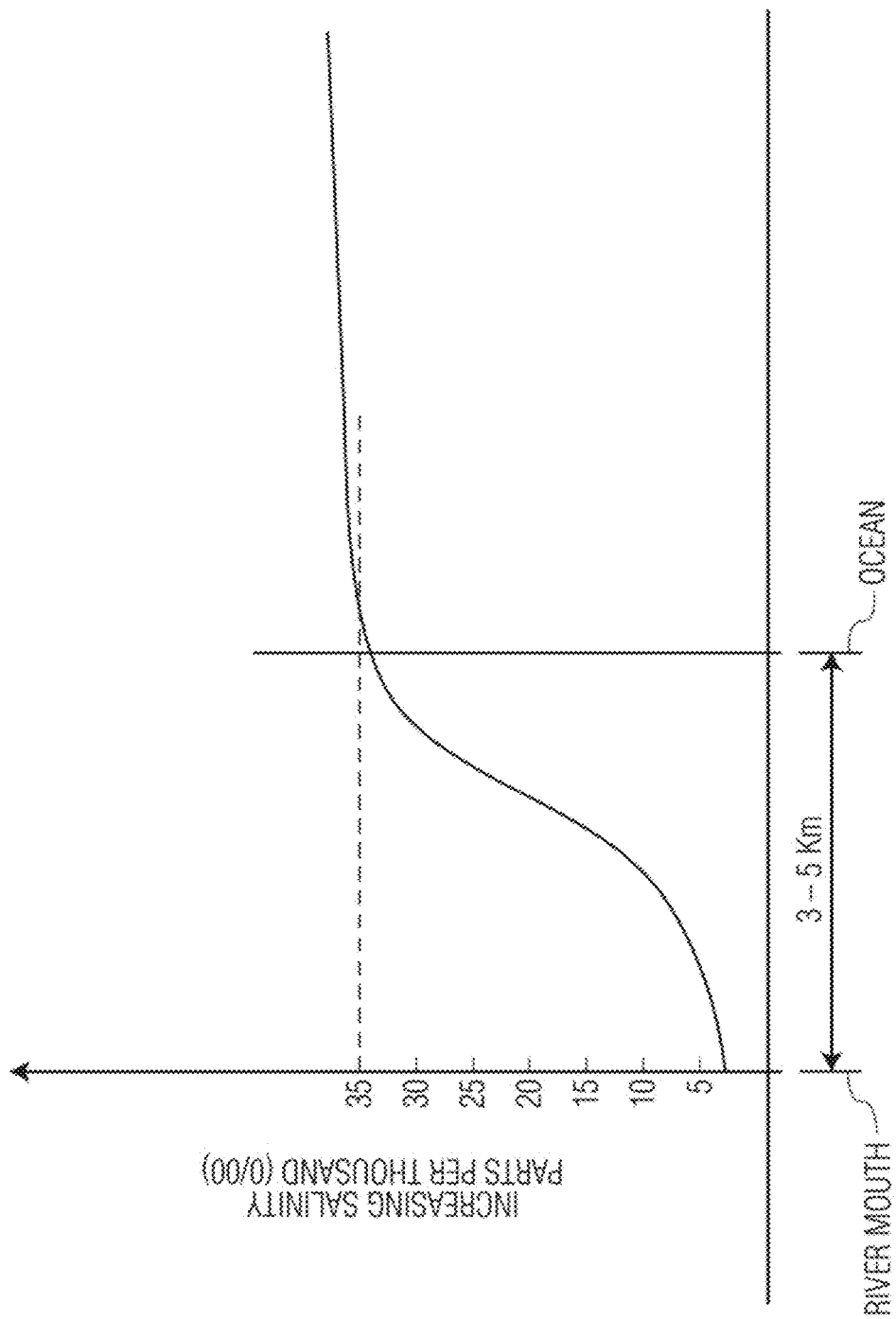

SYSTEMS AND METHODS FOR GENERATING ELECTRIC POWER FROM SALTS AND MINERALS IN BODIES OF WATER

BACKGROUND OF THE INVENTION

This invention relates to the production of electric energy using salts and minerals present in seas and oceans or lakes and the salinity gradient present in bodies of water or between bodies of water (e.g., between water at the mouth of a river and the sea or ocean into which the river flows).

In the discussion to follow reference to seas or oceans is meant to include any body of water (e.g., lake or pond) containing sails and/or minerals. Salinity as used herein refers to the saltiness or dissolved salt content (such as sodium chloride, magnesium and calcium sulfates, and bicarbonates) of a body of water (i.e., Salinity is a measure of the amount of salts in the water). Salts that dissolve in water break into positively and negatively charged ions. Conductivity is the ability of water to conduct an electrical current, and the dissolved ions are the conductors. The major positively charged ions are sodium ($Na^+$), calcium ($Ca^{+2}$), potassium ($K^+$) and magnesium ($Mg^{+2}$). The major negatively charged ions are chloride ($Cl^-$), sulfate ($SO_4^{-2}$), carbonate ($CO_3^{-2}$), and bicarbonate ($HCO_3^-$). Nitrates ($NO_3^{-2}$) and phosphates ($PO_4^{-3}$) are minor contributors to conductivity, although they are very important biologically. Increasing the number of dissolved ions increase salinity as well as conductivity, the two measures are related. The salts in sea water are primarily sodium chloride (NaCl), although as noted above there are other materials present (e.g., magnesium sulfate and calcium). Sea water is about 220 times saltier than fresh lake water. Numerous chemical elements have been identified in sea water.

There is a constant growing need to generate electric power. There is also a constant search to find new ways of producing energy which does not rely on fossil fuel. There is likewise a great demand for sources of clean renewable energy.

Known schemes for producing electrical energy from saltwater or salinity gradients are very complicated and cumbersome and not economically viable.

It is recognized that the salinity difference between seawater (relatively high salinity) and river water (relatively low salinity) represents a renewable source of enormous entropic energy, but extracting useful energy efficiently remains a difficult challenge.

Applicant has conducted experiments showing that electric energy may be produced by using the various properties of different chemicals present in bodies of water.

It is an object of the invention to provide a simple and direct means of generating electric energy from salts and minerals present in bodies of water and storing the generated energy or making it available for distribution directly or indirectly.

SUMMARY OF THE INVENTION

An electricity generating system embodying the invention includes apparatus which when placed in a body of salt water can produce electricity constantly and continuously. Applicant's invention resides, in part, in the recognition that two (or more) electrodes located in a body of water can be used to produce a current flow between them if: (a) there is a difference in salinity at the respective location of the two electrodes and the electrodes are of the same or different conductive materials; (b) the two electrodes are in locations of similar salinity but are of different conductive materials; or (c) even if the electrodes are in locations of similar salinity and of the same material but offer different surface area to the body of water. Applicant's invention also resides, in part, in the recognition that the efficiency of the current production is increased by forming the electrodes so they have a large surface area to interact with the body of salt water in which they are placed.

The system includes a first electrode located at a first location in a body of salt water and a second electrode located at a second location in said body of salt water. The first and second electrodes may be of the same or different materials and of the same or different surface area and are designed to present a large surface area to the body of water. A direct current, accompanied by a potential differential, can flow between the two electrodes which is a function of the salinity of the water and the composition of the electrodes. The direct current (and accompanying potential differential) is coupled to the input port of a converting device. The converting device may be any suitable power inverter which can produce an output AC voltage corresponding to the amplitude of the direct current at its input or a DC to DC converter to produce a corresponding output DC voltage.

In one embodiment the first electrode is located at a first location near the estuary of a river flowing into a body of salt water and the second electrode is disposed at a second location, a selected distance from the first electrode within the body of salt water, in a direction further distant from the estuary. The water at the first location has a given salt density and the water at the second location has a greater salt density than the water at the first location. A potential differential is developed between the first and second electrode which is applied to an output load.

Where paired electrodes are located at points of different salinity, the electrodes may be of the same material. Where the paired electrodes are located at points of similar salinity, the electrodes would be of different material or of same or similar material but with the electrodes having different surface areas resulting in current flow between the electrodes. There may be a multiplicity of paired electrodes to produce multiple different direct currents which can be combined to produce a combined output corresponding to the different currents.

Electrodes may be attached to a water craft (float or boat) to function as a source of electrical energy to help power the water craft's electrical system.

A still further embodiment of the invention includes forming a liquid conductor comprising a tube containing a high salt density liquid mixed with nano particles of selected active and conductive materials. The tube has a first end and a second end, the tube having a first stopper at the first end and a second stopper at the second end; the first and second stoppers for preventing the high salt density liquid from spilling out of the tube, and the first stopper adapted to receive a first conductive wire connected to the first stopper and through the first stopper to contact the high salt density liquid and the second stopper adapted to receive a second conductive wire connected to the second stopper and through the second stopper to contact the high salt density liquid.

BRIEF DESCRIPTION OF THE DRAWINGS

In the accompanying drawings, which are not drawn to scale, like reference characters denoted like components.

FIG. 5A is a plot of a typical salinity gradient of a body of water when going from the mouth of a river (fresh water) into large bodies of sea (salt) water;

DETAILED DESCRIPTION OF THE INVENTION

Figure 1:
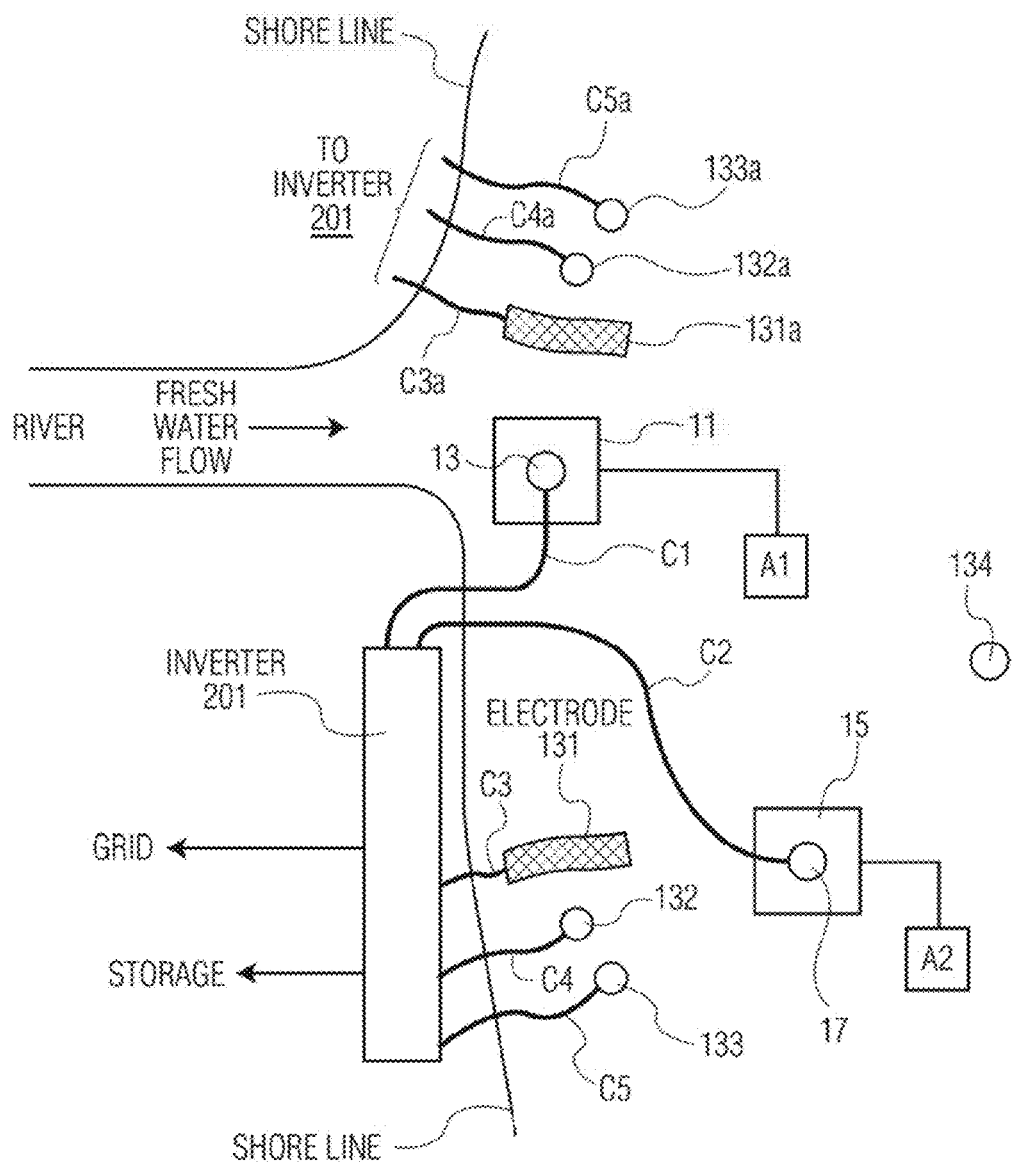
FIG. 1 is a highly simplified top view of a power generating system embodying the invention.
Figure 2:
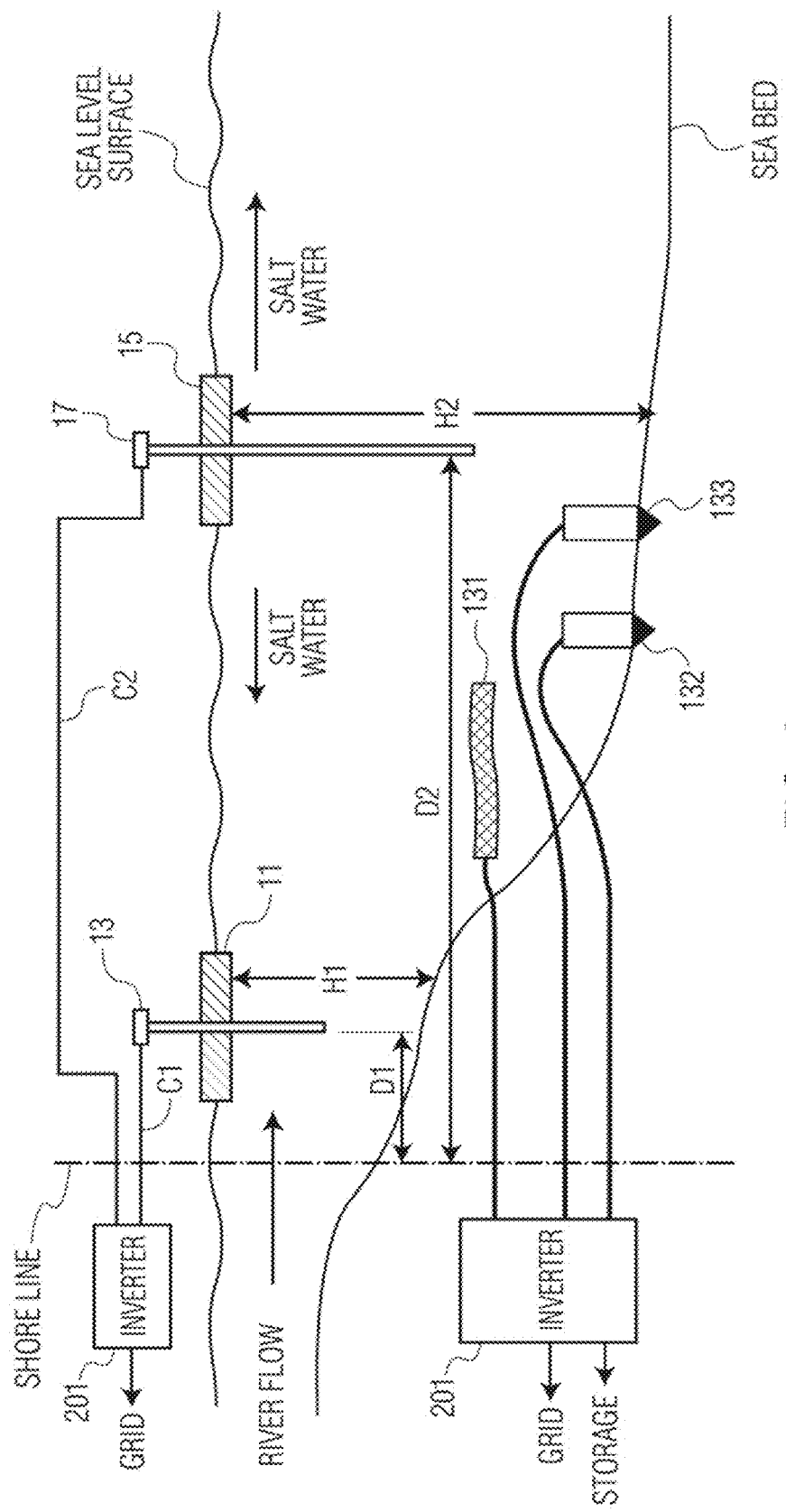
FIG. 2 is a cross-sectional diagram of a power generating system of the type shown in FIG. 1.
Figure 5:
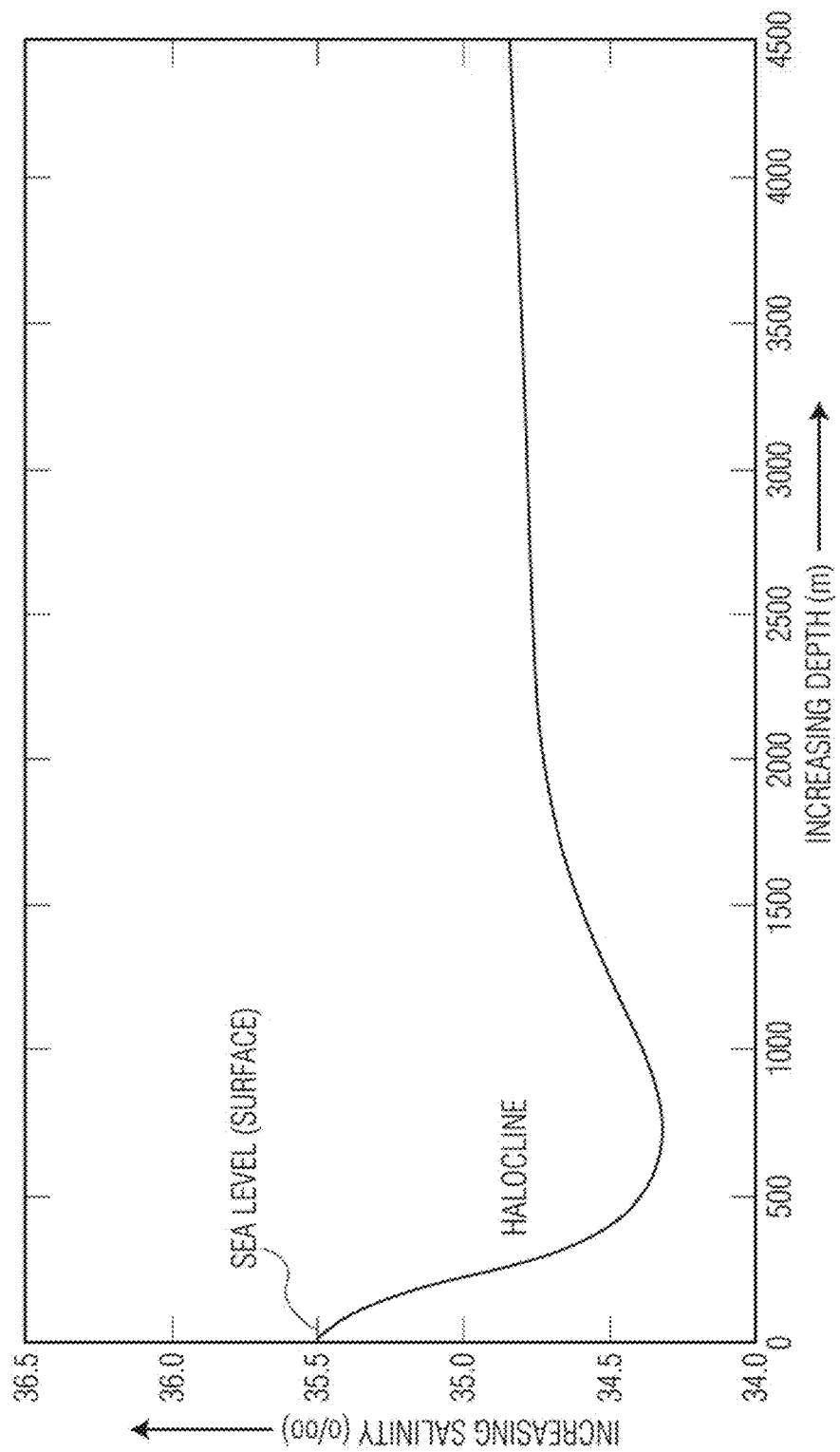
FIG. 5 is a plot of a typical salinity gradient present in large bodies of salt (sea) water.

Referring to FIGS. 1 and 2 there is shown a first float 11 to which is attached a first electrode 13 and a second float 15 to which is attached a second electrode 17. The first float 11 is located near the mouth of a river and near the shore (a distance D1 which may range from a few feet to several hundred feet from the mouth of the river) whereby it is floating in an area where fresh water flows into a body of salt water and mixes with the salt water. Therefore, the salinity of the water around float 11 is relatively low as shown in FIG. 5A near the origin. Referring to FIGS. 5 and 5A, the salinity at the point where the "fresh" water from a river flows into the ocean or sea would be, for example only, less than 3 per mile or (3 parts per thousand) or (3‰). The second float 15 is located a significant distance off-shore (a distance D2 which may range from a few hundred feet to several thousand feet from the shore line) and is floating in an area where the water is relatively highly saline. The salinity of the water around float 15 is relatively high [e.g., referring to FIG. 5, it could be, for example, about 35 per mille or (35 parts per thousand) or (35‰). The salinity may vary considerably. But, the differential between the salinity at the mouth (estuary) of the river and a significant distance offshore will always be significant.

In oceanography, it is traditional to express salinity not as percent, but as per mile (parts per thousand) (‰), which is approximately grams of salt per kilogram of solution. Note that salinity is the sum weight of many different elements within a given volume of water.

The floats 11 and 15 may be held in place by anchoring mechanisms A1 and A2, which may be passive anchors connected to their respective floats or active devices (e.g., boats or motoring devices) connected to their floats to maintain them in the desired position and location.

The first and second electrodes 13 and 17 extend below their respective floats and are immersed in the body of water surrounding their respective floats. There exists a potential differential between the first (13) and second (17) electrodes and a measurable current can flow between the first and second electrodes. Applicant has conducted experiments demonstrating the presence of a current flowing between electrodes 13 and 17 when a conduction path is formed between them and of the potential differential between the electrodes of this type. Applicant also discovered that the "paired" electrodes (e. g., 13, 17) could be of the same material and still generate electric power where there existed a salinity differential between the locations of the electrodes. Applicant also recognized that in an area of similar levels of salinity the two electrodes needed to be of different materials to generate electric power. As set forth herein, Applicant proposes using the electric power so generated and to do so on a continuous basis.

Referring to FIGS. 1 and 2 there is shown a cable C1 extending from first electrode 13 to an input of an inverter 201 and a cable C2 extending from the second electrode 17 to another input of inverter 201. The voltage differential applied across the two inputs of inverter 201 is a function of the differential between the potential of the first and second electrodes (13 and 17) which, in turn, is a function of the difference in the salinity of the water acting on the first and second electrodes and the nature of the first and second electrodes, inverter 201 may be any known inverter device which can convert the potential energy (voltage and current) present at its input into a corresponding (and proportional) output voltage. Inverter 201 may be any suitable device which can convert the DC signal at its input into a corresponding output AC voltage whose amplitude and/or frequency is a function of the amplitude of the input DC voltage. The output of inverter 201 may be, for example, an AC voltage suitable for coupling directly or indirectly to the power grid of a power utility or to an AC operated device. Alternatively, inverter 201 may be replaced with a DC to DC converter (not shown) which can convert the input DC voltage into an output DC voltage equal to or greater than the voltage at its input. The output DC voltage may be used to charge a battery or a capacitive storage device or to directly power a DC operated device. Note that first (e.g., 13) and second (e.g., 17) electrodes may be applied to the input port (e.g., IN1, IN2) of a converting device and cause a current to flow in or within the input port. As used herein and in the appended claims, the converting device may be; (a) any known suitable inverter (e.g., 201), where the inverter may be generally defined as an electrical device which changes an input direct current or voltage to a corresponding output AC voltage: or (b) a DC-to DC converter which converts an input direct current or voltage to a corresponding output DC voltage. Converting devices are known and their detailed operation need not be detailed.

A significant aspect of the invention is the recognition that a large body of "salty" sea water functions as a good, low resistance, conductor and this characteristic can be used to allow current (and all types of ions) to flow between the first and second electrodes via what is effectively relatively low impedance conduction paths.

FIGS. 1 and 2 also show that numerous different electrodes (131, 132, 133) floating or located off shore may be connected to inverter 201 via their respective cables (C3, C4, C5). Similarly, numerous different "paired" electrodes (131a, 132a, 133a) floating or located off shore may be connected to inverter 201 via their respective cables (C3a, C4a, C5a). The electrodes (e.g., 132 and 133 or 132a and 133a) need not be mounted on floats as shown in the Figures. Certain electrodes (e.g., 132, 133, 132a and 133a) are shown securely embedded in the sea bed (see FIG. 2) with considerable portions of their volume extending above the sea bed so as to interact with the seawater. Additional electrodes (e.g., 134) may be included in the system.

Figure 3A:
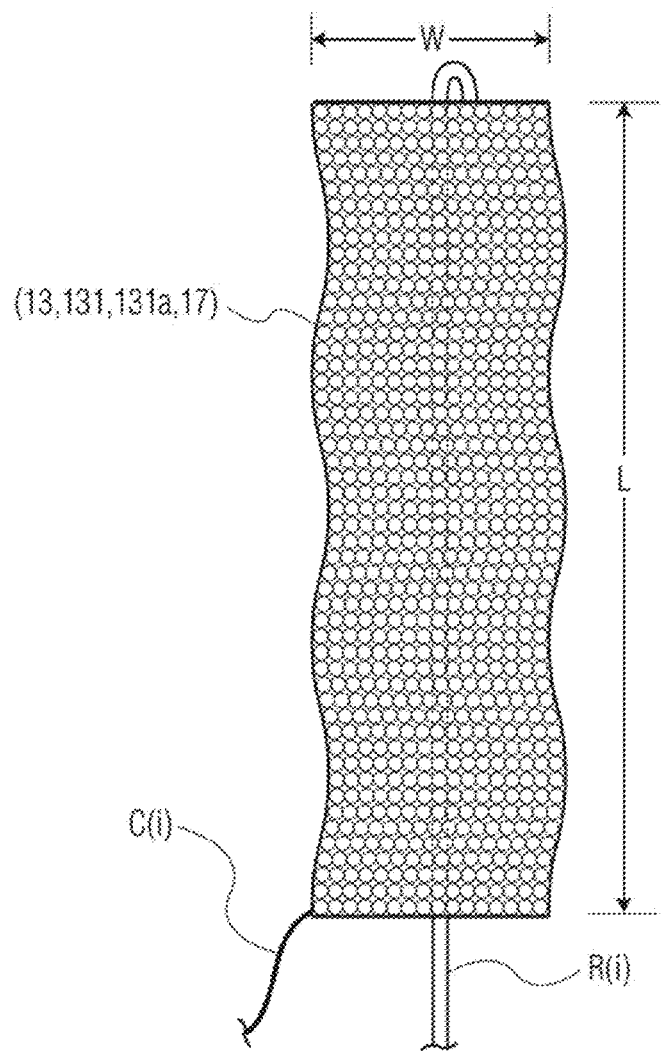
FIGS. 3A, 3B, 4A and 4B are different simplified views of an electrode structure suitable for use in practicing the invention.
Figure 4A:
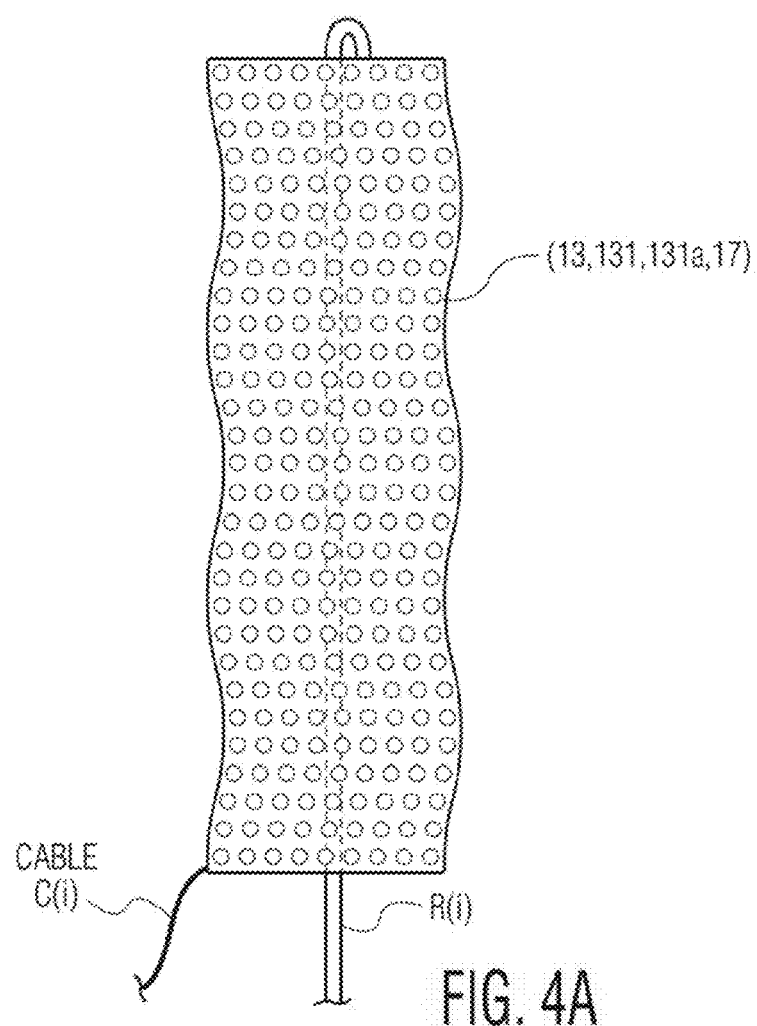

The electrodes intended for use should be shaped and constructed to present a large surface area to seawater. FIGS. 3A and 4A show a shape which some electrodes (e.g., 13, 17, 131, 131a) can take. These electrodes may range: (a) in width (W) from a few inches to dozens of feet, (b) in length (L) from a few inches to hundreds of feet; and (c) in thickness from under an inch to over a foot in FIGS. 3A and 4A the electrodes are formed with a mesh type structure to provide a large surface area for the seawater to interface with the electrodes. The larger the surface area the more electricity will be produced.

The electrodes may be formed from any suitable materials which can and will react with the salts and minerals in sea water. These materials include, but are not limited to virtually any metal or metal alloy such as copper, silver, magnesium, aluminum, chromium, iron, nickel, molybdenum, zinc, tantalum, titanium, carbon, etc. . . . For example, one electrode may be copper, the other may be of aluminum or else steel and aluminum. Where a large salinity gradient is present both electrodes may be of the same material.

Figure 3B:
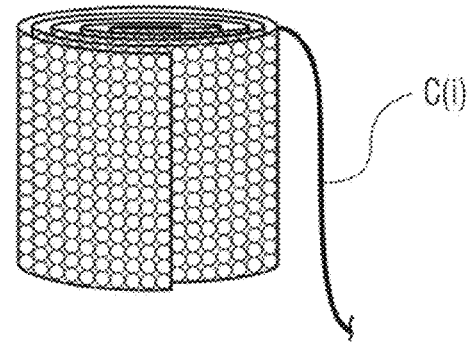
Figure 4B:
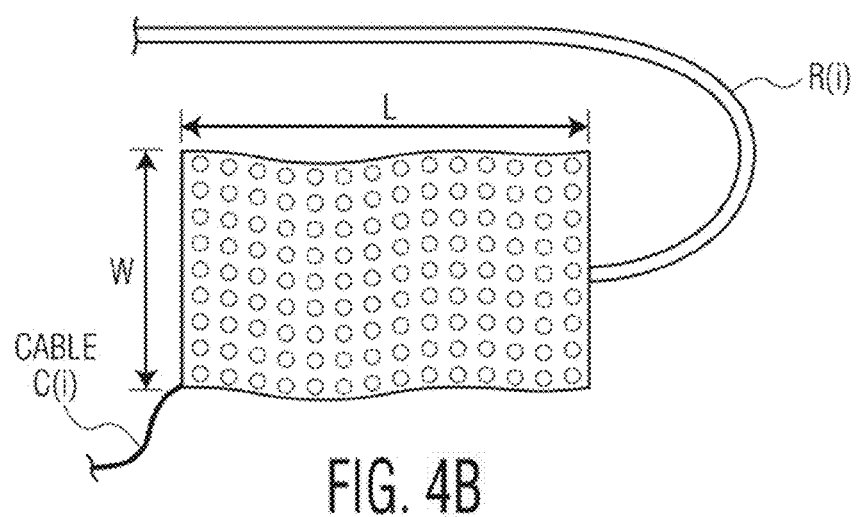

As shown in FIGS. 3A, 4A and 4B, an electrode may includes a rope [R(i)], or any suitable rolling up mechanism, which is designed to hold the electrode rolled up when desired and to selectively enable the electrode to be expanded to its full length. The electrodes may also include a mechanism (not shown) for attaching an electrode to its corresponding float. FIG. 3B shows the electrode rolled up (folded) which would typically be the mode in which it would be transported or towed. FIGS. 3A, 4A and 4B show the electrode unrolled or unfolded. Each electrode will have a cable (Ci) for connecting its corresponding electrode to an inverter or to a charging device.

Figure 7:
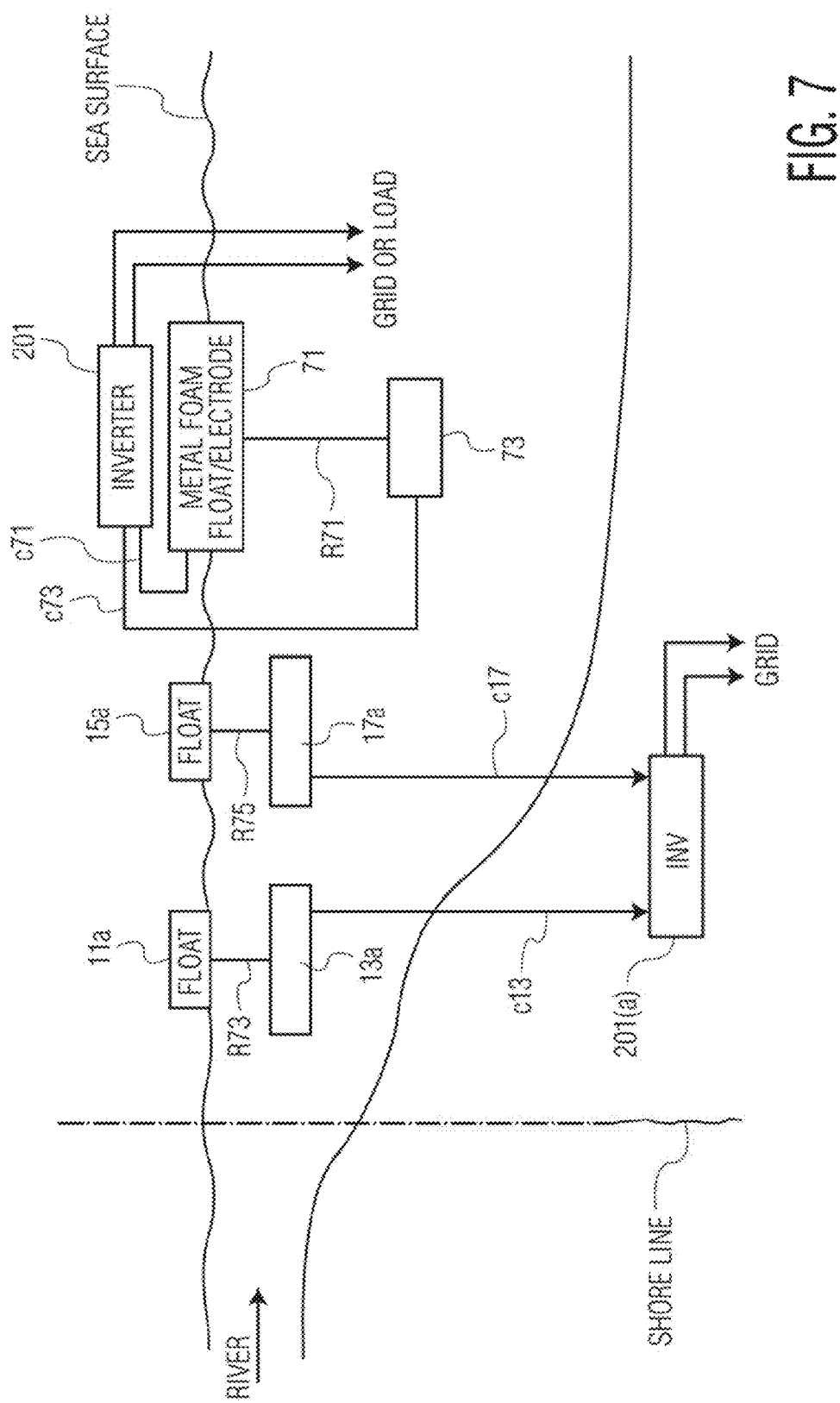
FIG. 7 is a cross-sectional diagram of still another power generating system embodying the invention.
Figure 7A:
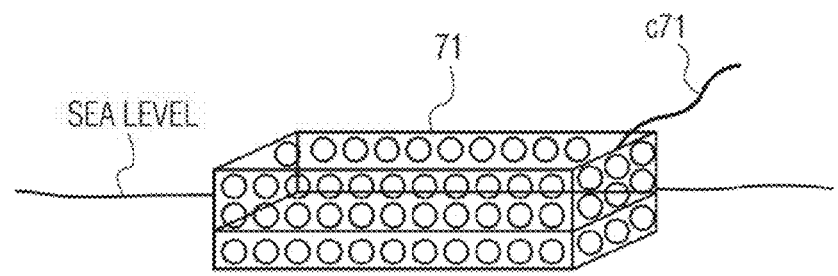
FIG. 7A is a highly simplified isometric drawing of a metallic float which can function as an electrode.
Figure 7B:
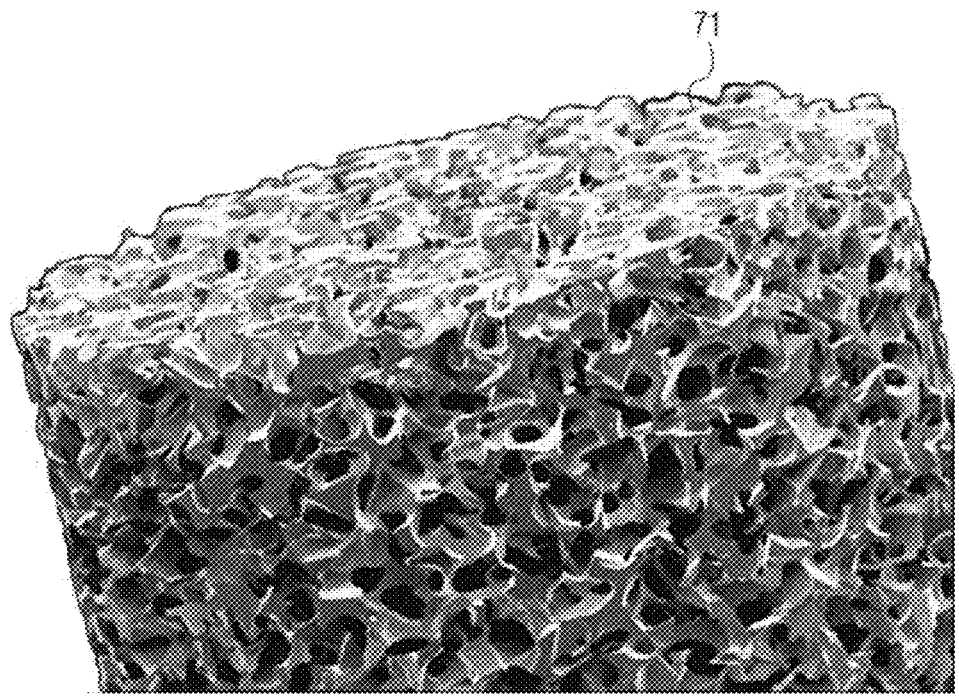
FIG. 7B is a photo of a metalized foam float which can be used as an electrode to practice the invention.
Figure 9:
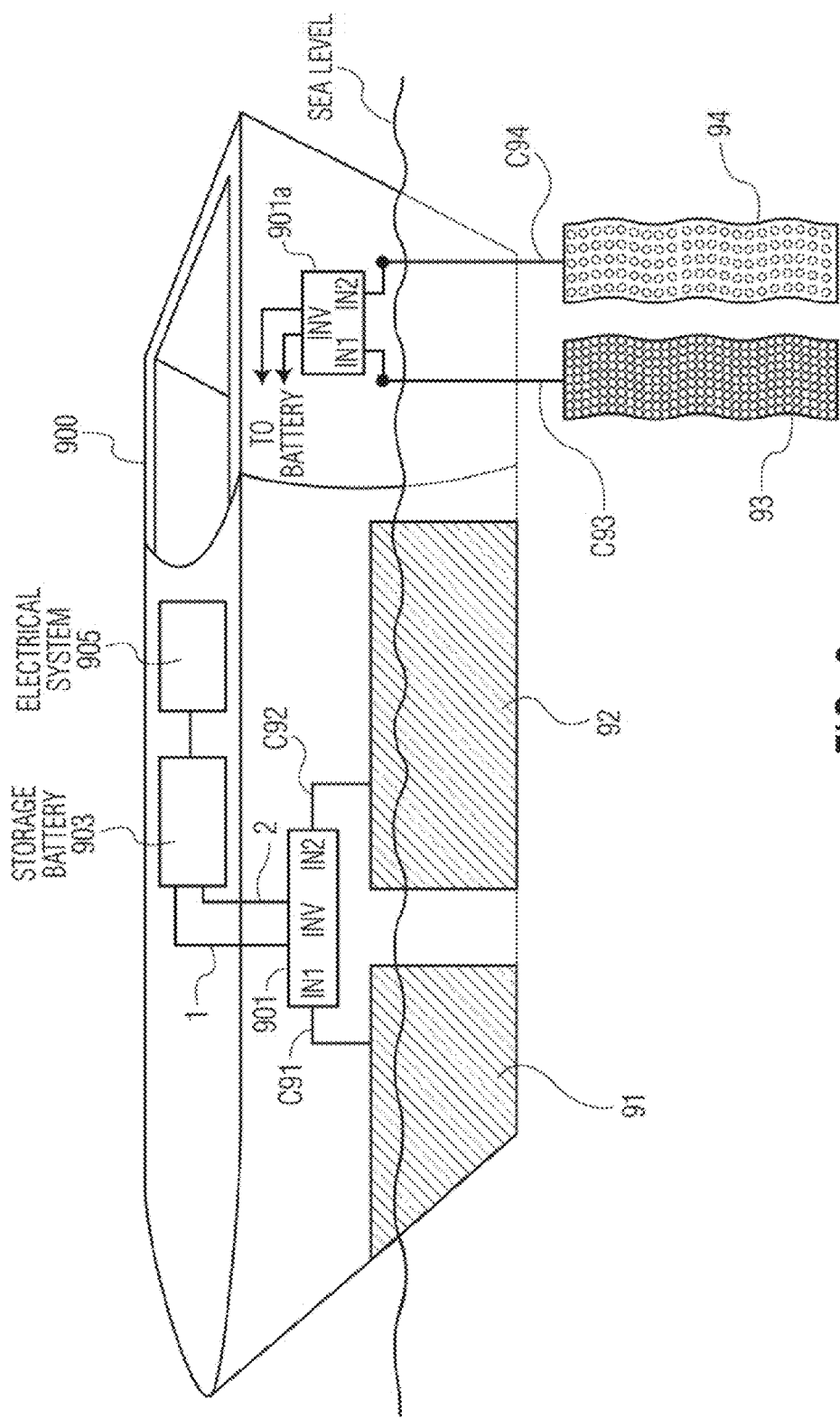
FIG. 9 is a drawing of electrodes mounted on a water craft to produce electrical energy.

The electrodes shown in FIGS. 3A and 4A, as well as those shown in FIGS. 7A and 7B, are designed to be deployed and extend from a float 11 or float 15 a preselected distance into the water about or below their floats. These electrodes may be deployed vertically down in the water or horizontally along the surface or at a selected level within a body of water. These electrodes have numerous apertures (Swiss-cheese like) to provide greater surface area for water to flow through the openings. The electrodes attached to floats or boats (see FIG. 9) can be replaced relatively easily when worn out or when they are to be cleaned. The floats to which electrodes are attached can be moved relatively easily to control their spacing. As shown in FIG. 9, electrodes embodying the invention can be mounted on boats and be used as a source of electrical energy to power the boat and/or other loads.

Figure 1A:
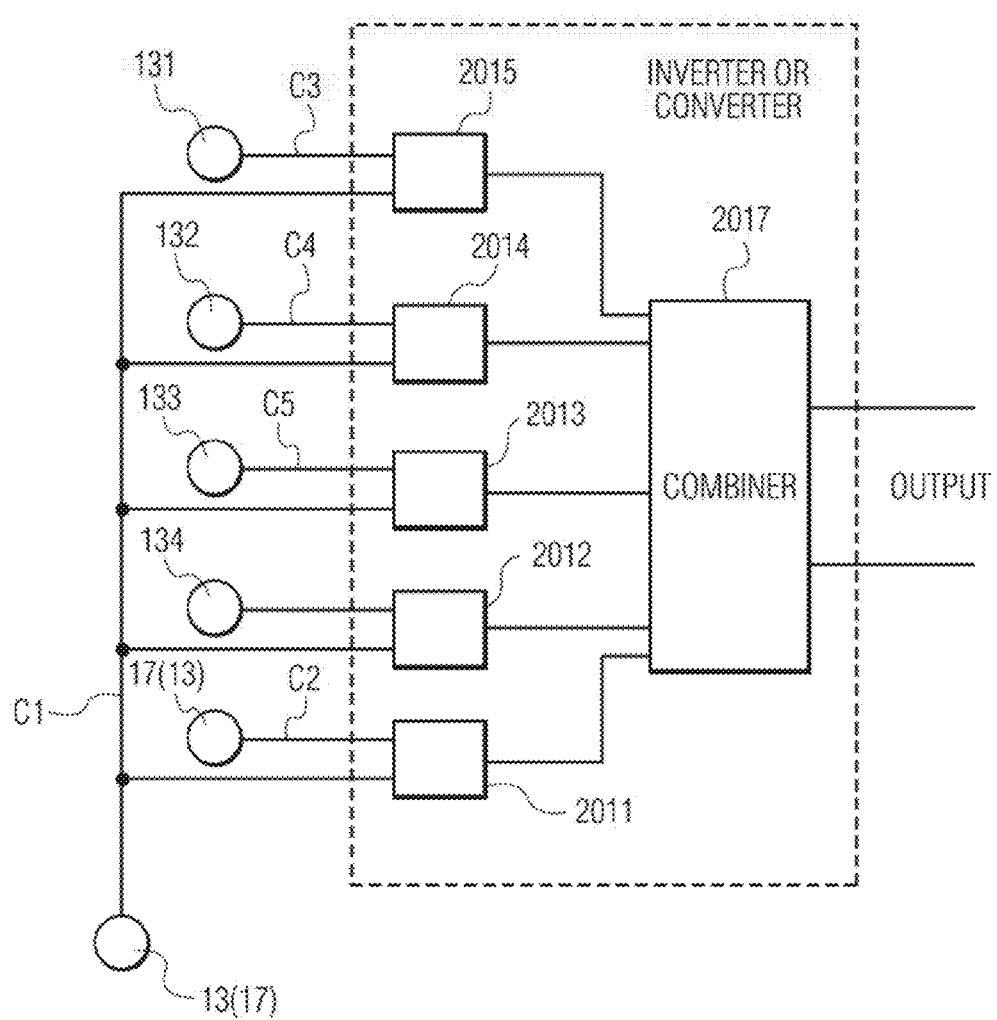
FIG. 1A is a simplified block diagram of apparatus for paring electrodes and combining the outputs of selected pairs to produce a combined electrical output.

Referring to FIG. 1A, there is shown apparatus for using one electrode (e.g., 13) as the central reference electrode against which all the other electrodes can be paired. The output of electrode 13 is paired with the output of electrode 17 and applied to inverter (or converter) 2011. The output of electrode 13 is paired with the output of electrode 134 and applied to inverter (or converter) 2012, The output of electrode 13 is paired with the output of electrode 133 and applied to inverter (or converter) 2013. The output of electrode 13 is paired with the output of electrode 132 and applied to inverter (or converter) 2014. The output of electrode 13 is paired with the output of electrode 131 and applied to inverter (or converter) 2015. The net output of inverters (or converters) 2011, 2012, 2013, 2014 and 2015 are applied to a combiner 2017 to produce an output which would be the total output generated by combining the outputs of a large number of electrodes. Electrode 13 can be made to have a much larger surface area than the sub electrodes with which it is paired. Note that electrode 17 instead of electrode 13 may be the electrode selected to have the larger surface area.

Another aspect of the invention is the positioning of the electrodes at different height levels in the body of water. Referring to FIG. 5, note that the salinity of seas and oceans decreases when going from sea level (i.e., sea surface) to a depth of approximately 500 to 750 meters. At depths greater than 800-900 meters the salinity increases and then flattens out.

Figure 6:
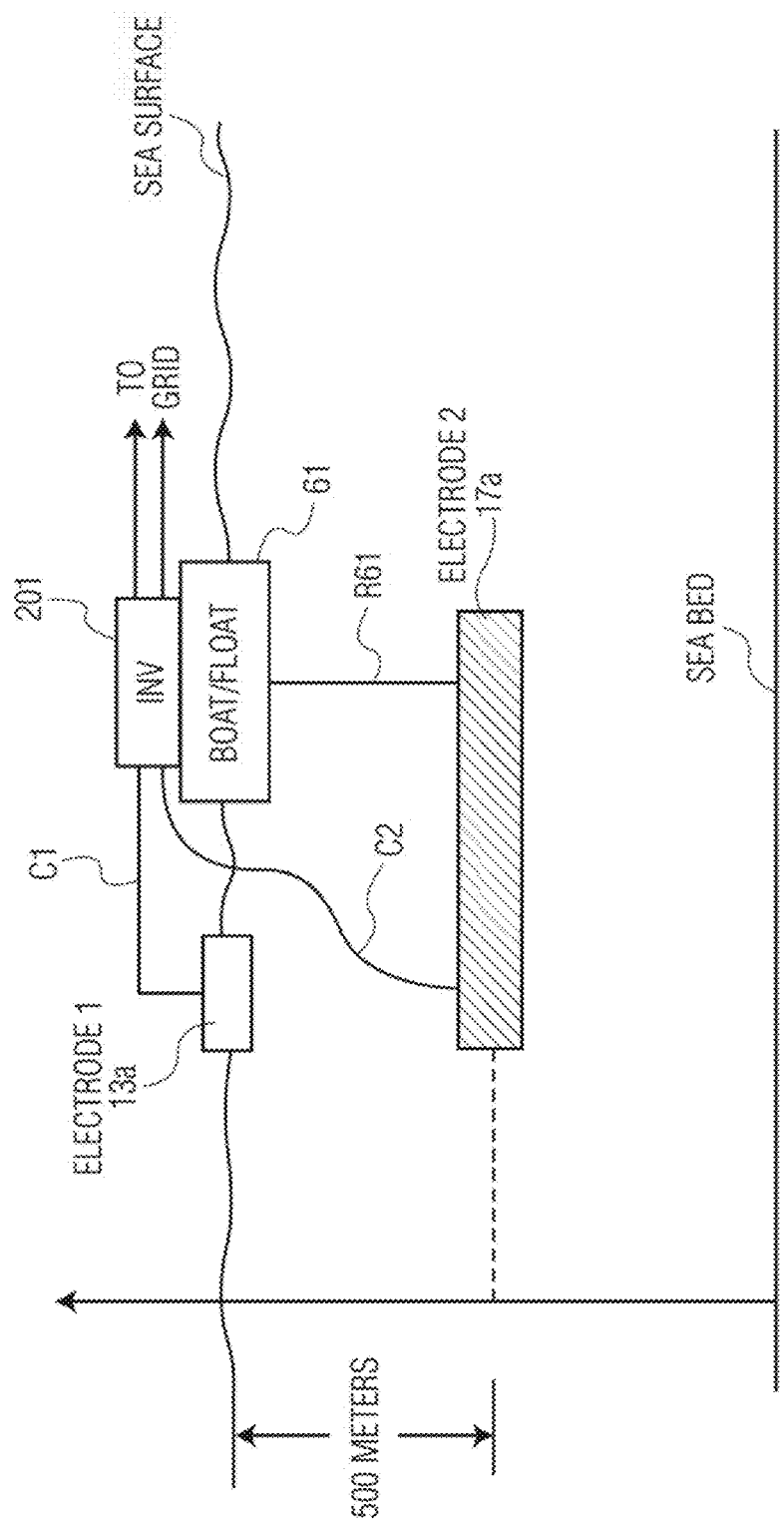
FIG. 6 is a cross-sectional diagram of another power generating system embodying the invention.

Applicant recognized that this phenomenon can be used advantageously to generate electricity. A system to capture electrical energy which may be generated due to the salinity gradient is shown in FIG. 6. A first electrode 13a may be disposed at or near the surface of a body of water and a second paired electrode 17a may be disposed 500 to 1000 meters below the sea surface. The salinity gradient results in a potential energy difference between the two electrodes (13a and 17a). The potential difference can be applied to an inverter 201, mounted on a float 61, which converts the potential energy differential to a desirable AC voltage. The float 61 may be any suitable water craft capable of passive or active movement. Note that the buoyancy of electrode 17a can be controlled in any known manner so that it is maintained at a different salinity level than the one set for electrode 13a. In FIG. 6 electrode 17a is shown attached to boat/float 61 via a connecting rope or rod R61. Electrode 13a may likewise be attached to float 61 by any suitable mechanism (not shown).

FIG. 7 illustrates a structure in which a float and an electrode are integrated to form a floating electrode 71 which is shown to be a metal foam floating electrode. A paired electrode 73 is positioned at a different point to generate a potential differential. The two electrodes (71, 73) are then coupled via their respective cables (c71, c73) to the input port of an inverter 201 whose output can be coupled to the power grid or any other suitable load, in FIG. 7, electrode 73 is shown attached to metal foam float/electrode 71 via rope or rod R71 to keep them spaced apart by some predetermined distance or depth. FIG. 7A is a representation of a metal foam float which can be used as an electrode. The float/electrode 71 is so light that it can float in, and on, the water.

FIG. 7B is a photograph of a metal foam which can be used to form a floating foam electrode. The metal foam float is an open cell foam construction to provide a very large surface area between the electrode and the body of water in which it is positioned. The foam structure enables the construction of very tight electrodes which can be located on the surface of the body of water. The foam structure is very desirable but similar structures like metal mesh (e.g., steel wool or sponge) are also useful in practicing the invention. The materials for making the metal foam/mesh electrodes include any suitable metals, materials or metal alloys. These include, by way of example, but not limited to, copper, silver, magnesium, aluminum, chromium, iron, nickel, molybdenum, zinc, tantalum, titanium, and their alloys or carbon.

The foam float can be connected to a buoyancy controlling apparatus so it can be made to float at specified depths at or below sea level.

Figure 8A:
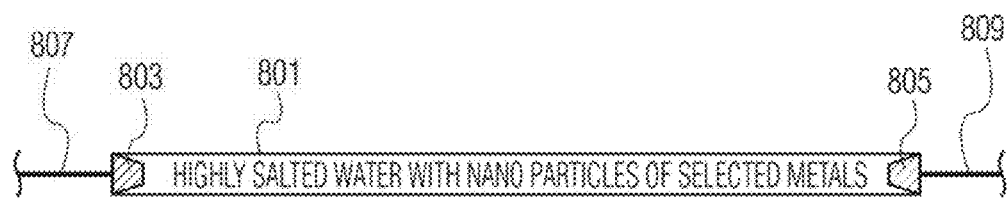
FIGS. 8A and 8B are drawings of cables embodying the invention.

Applicants recognized that liquids (e.g., water) having a high salinity density can be used to form conductors which have a relatively high conductivity. FIG. 8A shows a "liquid" conductor 801, embodying one aspect of the invention, comprised of a plastic or nylon tubing filled with high salinity water (i.e., high salt concentration) mixed with nano particles of electrically conductive (and active) metals such as, but not limited to, lithium, potassium, caesium, copper, silver, magnesium, aluminum, chromium, iron, nickel, molybdenum, zinc, tantalum, titanium, and their alloys. The tubing 801 is terminated at one end with a contact/plug 803 and at its other end with a contact/plug 805. The contact/plugs (803, 805) ensure that the high salinity contents of the tube are contained within the tube and also provide good electrical contact. A wire 807 is shown connected to contact 803 and a wire 809 is shown connected to contact 805. The high salinity mixed with nano particles water contents of liquid conductor 801 provide a high concentration of ions resulting in a relatively low impedance conduction path between wires 807 and 809. Note that this is achieved with little heat dissipation.

Figure 8B:
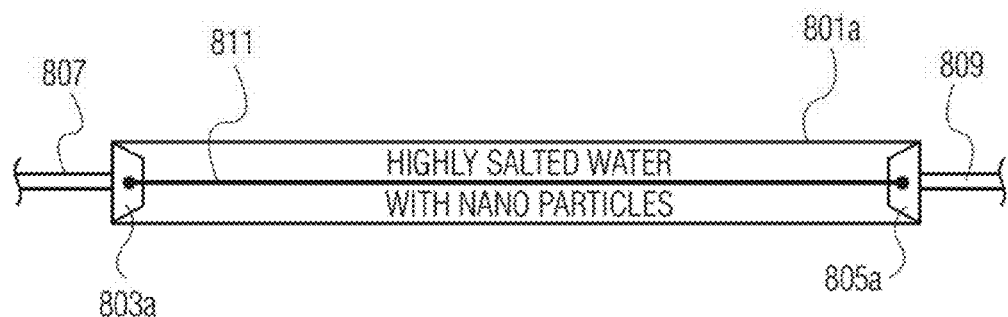

FIG. 8B shows a "liquid" conductor 801a comprised of a plastic or nylon tubing filled with high salinity water mixed with nano particles as discussed above for FIG. 8A. The tubing 801a is terminated at one end with a contact/plug 803a and at its other end with a contact/plug 805a. The "liquid" conductor 801a differs from what is shown in FIG. 8A in that there is also a metal conductor 811 connected between contacts 803a and 805a to provide a conduction path in parallel with that of the high salinity water. This is intended to reduce any possibility of bubbling within the tube.

Figure 8C:
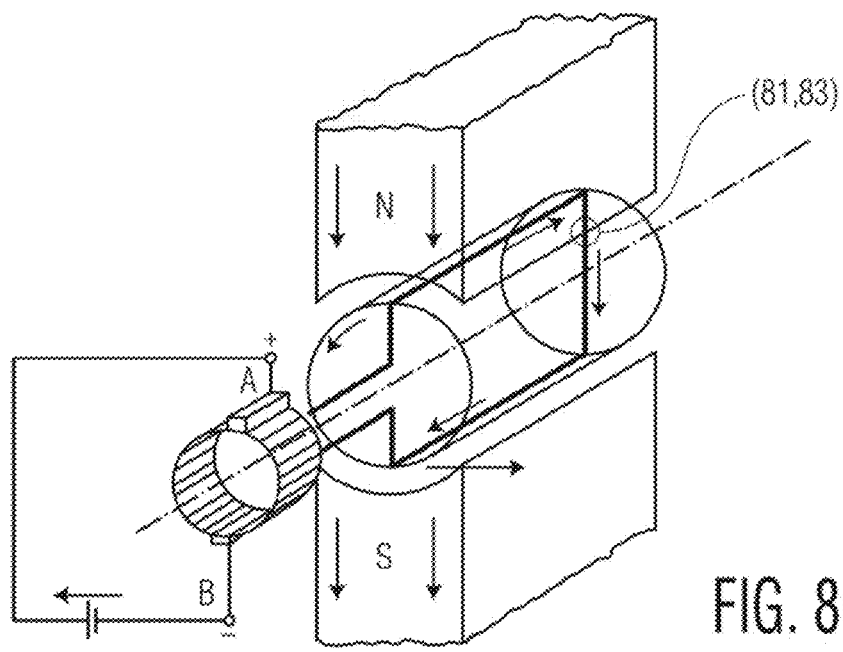
FIGS. 8C, 8D and 8E are drawings of power generating and power transformers using the cables of FIGS. 8A and 8B.
Figure 8D:
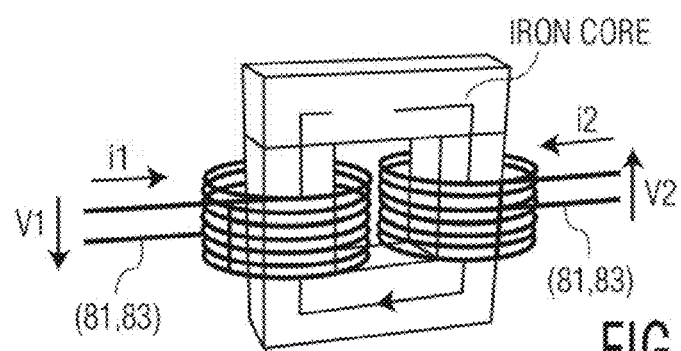
Figure 8E:
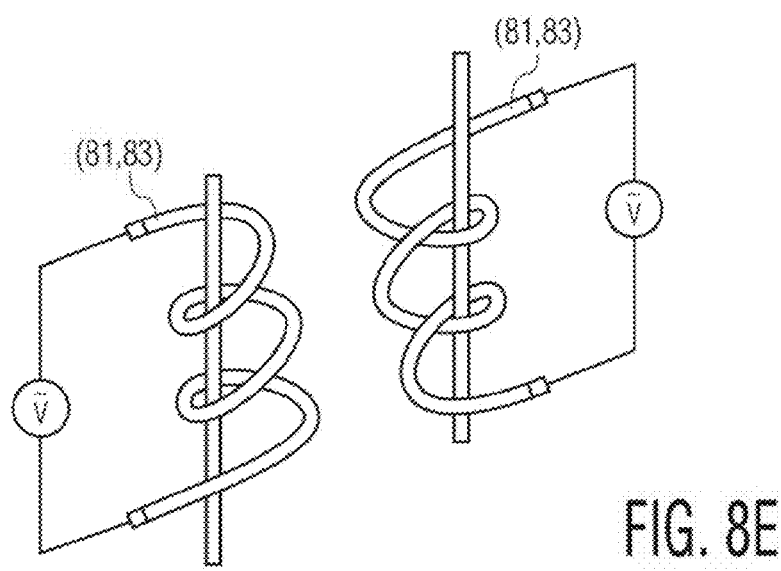

Conductors 81 or 83 shown in FIGS. 8C, 8D and 8E include one or more liquid conductors 801 or 801a of the type shown in FIGS. 8A and 8B. Referring to FIG. 8C, there is shown a drawing of an elementary generator formed by connecting the armature to conductors 81 or 83 mounted within a magnetic field. This demonstrates the use of high salinity water filled tubes to replace the use of known metal wire conductors to form a known generator.

Referring to FIGS. 8D and 8E, there is shown a transformer whose coils 81, 83 are formed using liquid conductors 801 or 801a. This is another demonstration showing the use of high salinity water filled tubes to replace the use of known metal wire conductors to form a known transformer.

Figure 9A:
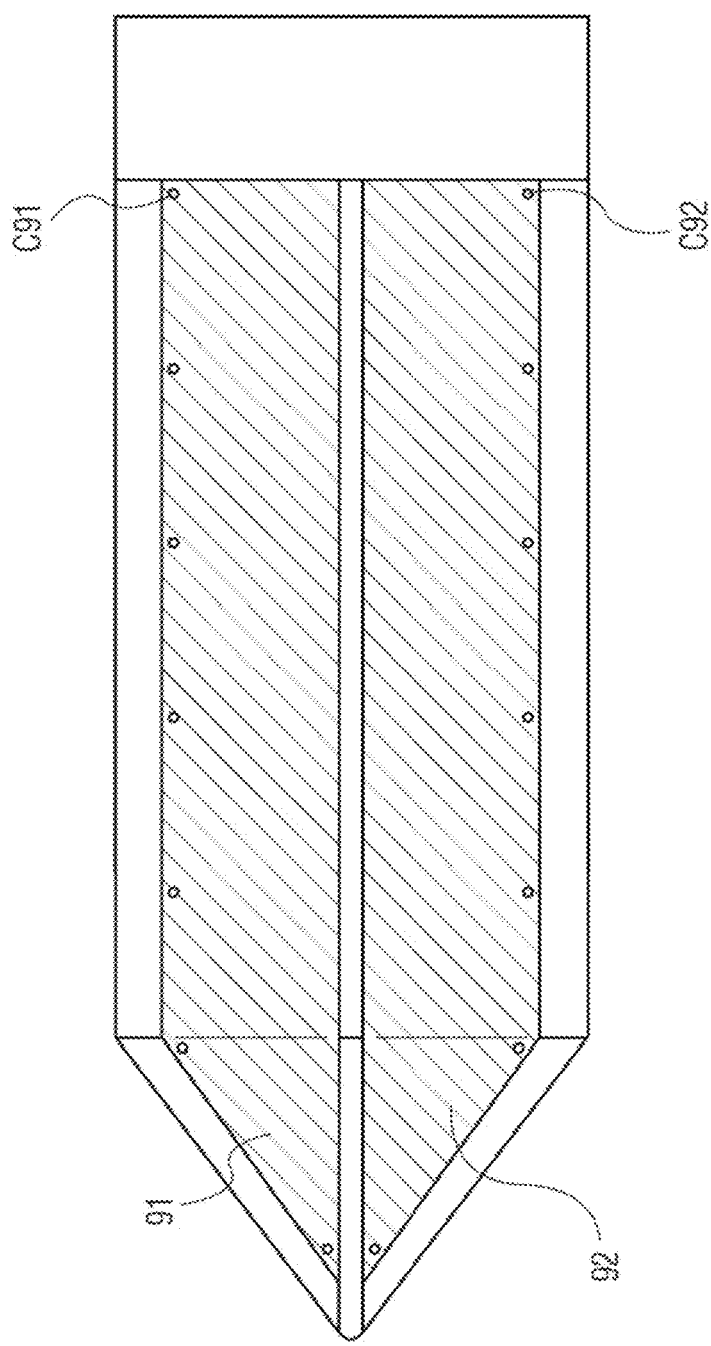
FIGS. 9A and 9B are other views of the electrodes mounted on the water craft.
Figure 9B:
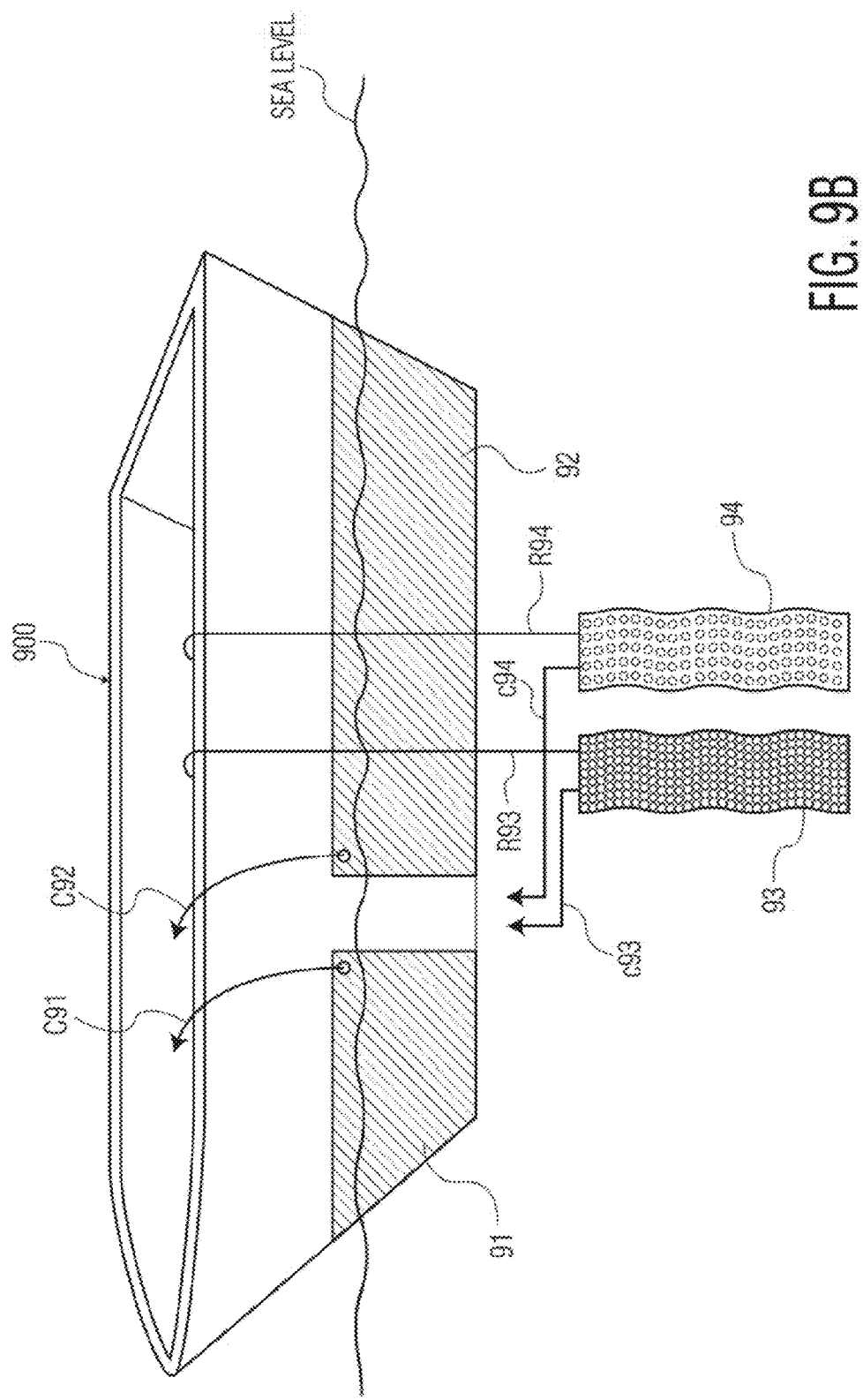

Referring to FIG. 9, there is shown a water craft (boat or raft) 900 having metal electrodes 91 and 92 attached to the sides of the boat. Electrodes 91 and 92 may be metal plates attached to the outside of the boat. The electrodes 91 and 92 may extend underneath the water craft as shown in FIG. 9A. Cables C91 and C92 are coupled between electrodes 91 and 92 and the input port (IN1, IN2) of an inverter 901. The output (O1, O2) of inverter 901, which if it is an AC voltage, is rectified and then applied to a storage battery 903 and functions to keep on recharging the battery 903. Note that inverter 901 may be a DC-to-DC converter used to recharge battery 903. Battery 903 is shown connected to the boat's electrical system 905 to provide needed electrical energy and power to the boat's electrical system. In this instance, electrodes 91 and 92 are preferably of different materials or of the same material with different surface areas. The electrodes may be of any suitable metal, metal alloy or material including, but not limited to, copper, aluminum, stainless steel, manganese, silver, or carbon. Electrodes 91, 92 may also be electrodes of the type shown in FIG. 3A, 4A, 7A or 7B. FIG. 9 also shows electrodes 93, 94 coupled via their respective cables (C93, C94) to the inputs (IN1, IN2) of an inverter 901a which may be mounted on and/or within boat 900. The output of inverter (or converter) 901a is applied directly (if rectified) or indirectly (via a rectifier) to the input of storage battery 903 or a like energy storage element. Note that electrodes 93 and 94 are similar to the electrodes shown in FIGS. 3A, 4A, 7A and 7B. Electrodes 93 and 94 may be rolled out (unfurled) via ropes R93, R94 as shown in FIG. 9B, when the water craft (boat) is at rest/stopped to maximize their energy producing capability. Alternatively, they may be rolled up when the boat is moving or when it is undesirable or unnecessary to generate power. Note that the battery may be recharged by means of a generator coupled to a gasoline or diesel engine or any hybrid system. Note also that the battery 903 may be recharged using the apparatus and system described in Applicant's co-pending application bearing Ser. No. 13/317,129 directed to a water current energy converter system.

In general, the structure of the electrodes (e.g., foam, mesh, sponge or Swiss-cheese like) used to practice the invention is generally designed to provide an increase in the surface area of the electrode so as to maximize its interface and reaction with the body of water into which it is placed. In bodies of like salinity the electrodes will be selected to be of different materials having different electric conductivities and/or to be of different surface area. In bodies of different salinity the electrodes will be selected to be of different materials having different electric conductivities and/or to be of different surface area and/or of same material.

What is claimed is:

1. An electricity generating system comprising:
a body of salt water being a sea, ocean or lake having different salt densities at different locations;
a first location in said body of salt water, the water at the first location having a given preexisting salt density;
a second location in said body of salt water located at a selected distance from the first location within said body of salt water; the water at the second location having a preexisting second salt density, different than said first salt density;
a first electrode attached to a first float positioned in said first location and a second electrode attached to a second float positioned in said second location; the first and second electrodes designed to provide a large surface area to the body of water into which it is located and the material of the electrodes being selected as a function of the salt density at the first and second electrodes; wherein one of said first and second electrodes functions as an anode and the other one of said first and second electrodes functions as a cathode;
a converting device having an input port adapted to receive an input current and having an output port at which is produced an output voltage corresponding to the input current; and
cable means connecting the first and second electrodes to the input port of the converting device for enabling a direct input current due to said first and second electrodes to flow in said input port and for the production of a corresponding output voltage.

2. An electricity generating system as claimed in claim 1 wherein the first location is near the estuary of a river, said first location being an area of low salt concentration; and wherein the second location is located at a selected distance from the first location within said body of salt water in a direction further distant from said estuary; the water at the second location having a greater salt density than at said first location.

3. An electricity generating system as claimed in claim 1 wherein said first electrode is attached to a first float positioned at said first location and wherein said second electrode is attached to a second float positioned at said second location and wherein said first and second electrodes are not physically connected to each other in the body of water.

4. An electricity generating system as claimed in claim 1 wherein selected ones of said first and second electrodes are integrated with their respective floats.

5. An electricity generating system as claimed in claim 1 wherein at least one of said electrodes is formed of an open cell foam material for increasing the reactive surface area of the electrode accessed by water in which it is intended to be located.

6. An electricity generating system as claimed in claim 1 wherein said first and second electrodes are of the same or similar materials.

7. An electricity generating system as claimed in claim 1 wherein the electrodes are formed of selected ones of the following material, or of their alloys: copper, magnesium, aluminum, tantalum, titanium, silver, chromium, zinc, or carbon.

8. An electricity generating system as claimed in claim 1 further including N additional electrodes and N additional converting devices, and wherein each one of said additional electrodes and one of said first and second electrodes is applied to a different one of said additional converting devices.

9. The electricity generating system as claimed in claim 1, wherein said first location with its corresponding first electrode is located at a first vertical level within the body of water, said first level having a first salt density, and wherein said second location with its corresponding second electrode is located at a second vertical level within the body of water, said second level having a second salt density, different than said first level and wherein said first and second electrodes are not physically connected to each other in the body of water.

10. The electricity generating system as claimed in claim 9, wherein said first electrode located at said first level is positioned at or near the surface of the body of water and wherein said second electrode is located at a depth greater than 400 meters.

11. An electricity generating system as claimed in claim 1, wherein one of said electrodes is a metal foam electrode and wherein said converting device is mounted on top of said metal foam electrode.

12. An electricity generating system comprising:
a body of salt water being a sea, an ocean or a lake having different salt densities at different locations;
a first location in said body of salt water, the water at the first location having a given preexisting salt density;
a second location in said body of salt water located at a selected distance from the first location within said body of salt water; the water at the second location having a preexisting second salt density, different than said first salt density;
a first electrode positioned within said first location and a second electrode positioned within said second location; said first and second electrodes being spaced apart within a said body of salt water, at least one of said first and second electrodes being parts of floats formed of a foam or mesh metal material for increasing the reactive surface area of the at least one electrode within the body of salt water;
a converting device having an input port adapted to receive an input current and having an output port at which is produced an output voltage corresponding to the input current; and
cable means connecting the first and second electrodes to the input port of the converting device for enabling a direct input current due to said first and second electrodes to flow in said input port and for the production of a corresponding output voltage.

13. An electricity generating system as claimed in claim 12 wherein said first electrode is positioned in a first location in said body of salt water, the water at the first location having a given salt density; and wherein said second electrode is located at a second location, the water at the second location having a greater salt density than at said first location.

14. An electricity generating system as claimed in claim 12 wherein said first and second electrodes being parts of floats which are attached to a water craft.

15. An electricity generating system as claimed in claim 14 wherein said first and second electrodes are attached to a water craft via apparatus to enable the first and second electrodes to be selectively unfurled or retracted.

16. An electricity generating system as claimed in claim 14, wherein said water craft includes at least two additional electrodes attached to the water craft.

17. An electricity generating system as claimed in claim 12 wherein the electrodes are formed of selected ones of the following material, or of their alloys: copper, magnesium, aluminum, tantalum, titanium, silver, chromium, carbon, zinc.

18. An electricity generating system as claimed in claim 12, wherein said converting device includes at least one of an inverter or a DC-to-DC converter.

19. An electricity generating system as claimed in claim 12 wherein said first electrode is located at a first location near the estuary of a river flowing into a body of salt water, and wherein said second electrode is located at a selected distance from the first electrode within said body of salt water in a direction further distant from said estuary; the water at the second location having a greater salt density than at said first location.

* * * * *